March 2, 1943.  C. A. SAWTELLE  2,312,363
VEHICLE BRAKE
Filed Sept. 5, 1941  2 Sheets-Sheet 1

Inventor
Charles A. Sawtelle

J. S. Murray
Attorney

March 2, 1943.                 C. A. SAWTELLE                 2,312,363
                                 VEHICLE BRAKE
              Filed Sept. 5, 1941                    2 Sheets-Sheet 2
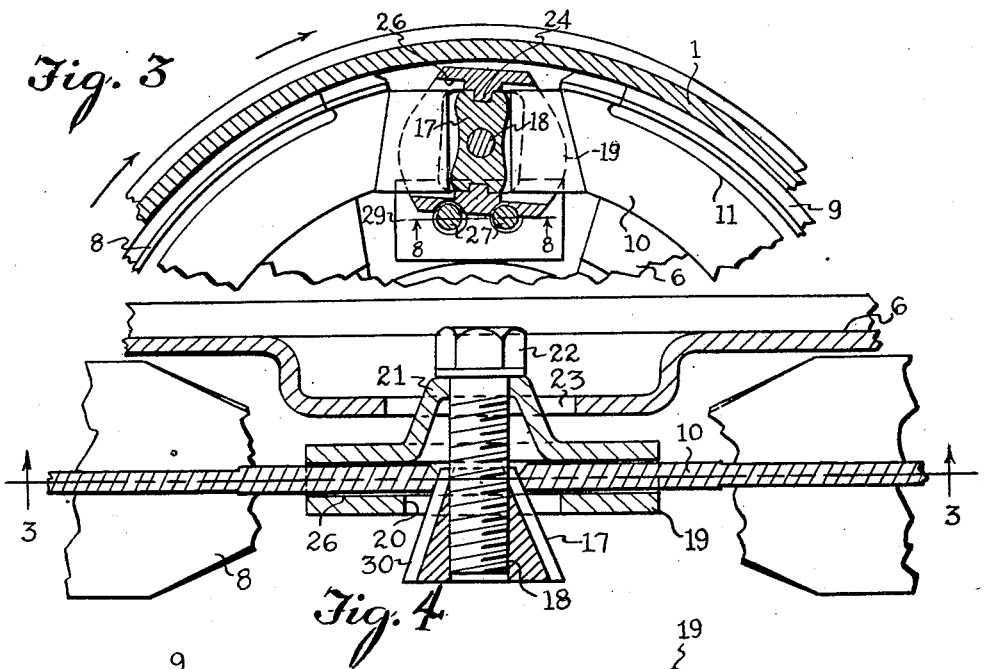
Fig. 3
Fig. 4
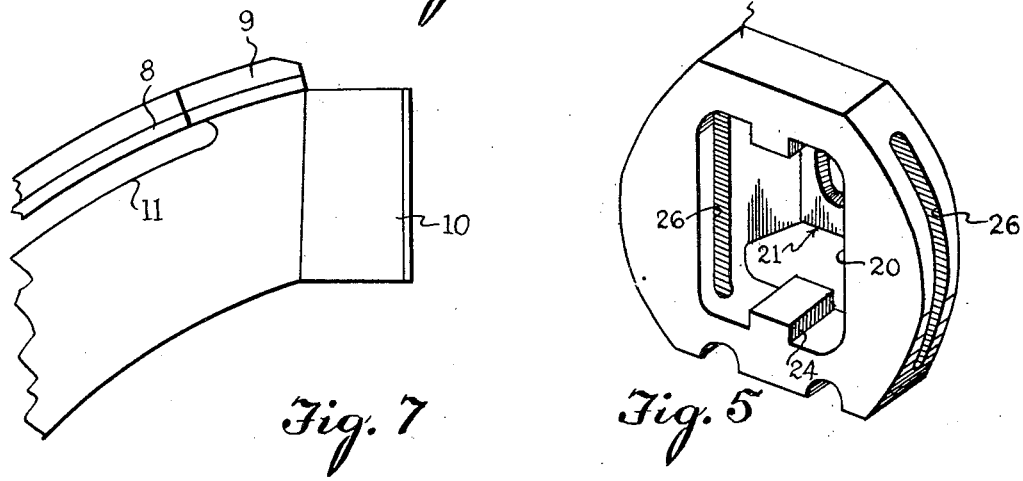
Fig. 7
Fig. 5
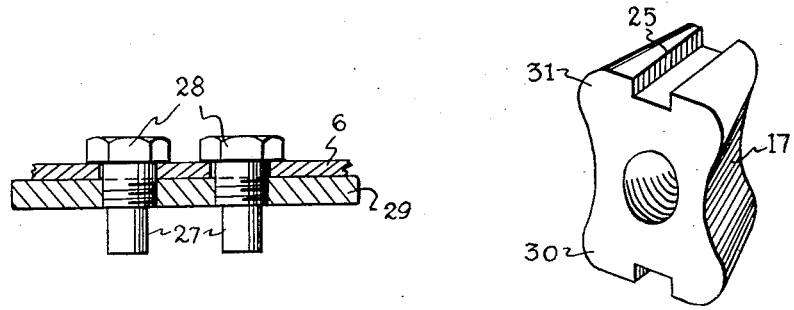
Fig. 8
Fig. 6
Inventor
Charles A. Sawtelle
By
J. S. Murray
Attorney Patented Mar. 2, 1943

2,312,363

UNITED STATES PATENT OFFICE 2,312,363

VEHICLE BRAKE

Charles A. Sawtelle, Plymouth, Mich.

Application September 5, 1941, Serial No. 409,601

12 Claims. (Cl. 188—78)

This invention relates to brakes and particularly vehicle brakes.

An object of the invention is to effect substantial equalization of the effort applied by a pair of brake shoes and to thereby substantially equalize wear of said shoes.

Another object is to afford one of the shoes of a two-shoe brake a slight rotational movement upon its initial application to the drum, and to utilize such movement to apply the other shoe under a pressure equalized with that applied by the first mentioned shoe.

A further object is to subject one of a pair of brake shoes to a slight rotational actuation by the drum, and to provide a lever device responsive to such actuation for transmitting a predetermined fraction of the torque of said shoe to the companion shoe to apply the latter.

A further object is to utilize said lever device in effecting an adjustment compensating for wear of the friction faces.

These and various other objects are attained by the construction hereinafter described and illustrated in the accompanying drawings, wherein:

Fig. 3 is a fragmentary view of the upper portion of the brake, taken in said plane of rotation and showing a brake-applying position of certain parts.

Fig. 4 is a cross sectional view taken on the line 4—4 of Fig. 2.

Fig. 5 is a perspective view of a torque-transmitting lever.

Fig. 6 is a perspective view of an adjusting nut used in compensating for wear of the friction faces.

Fig. 7 is an elevational view of the upper end of one of the brake shoes.

Fig. 8 is a sectional detail, taken on the line 8—8 of Fig. 3, showing a dual fulcrum provision for the lever shown in Fig. 5.

Figures 1, 2:
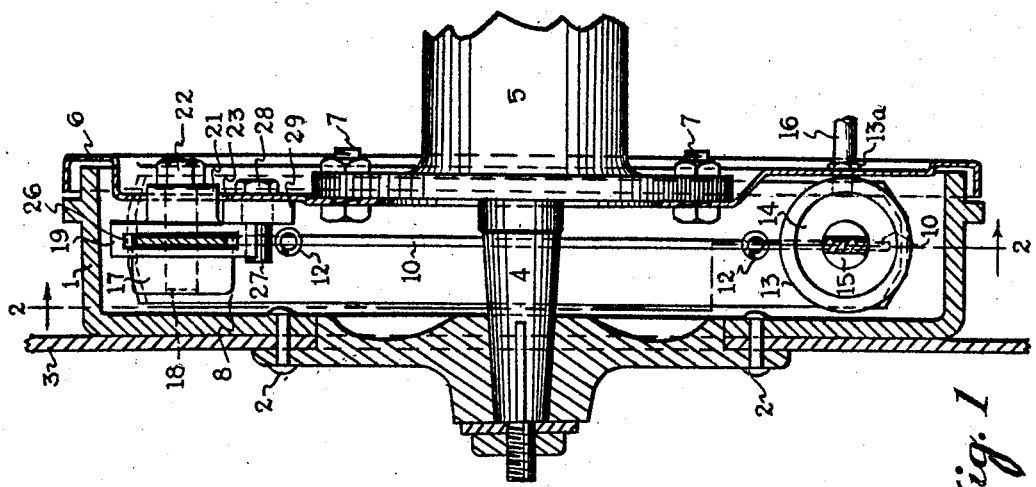
Fig. 1 is a diametrical, vertical sectional view of the improved brake.
Fig. 2 is a sectional view of the brake, taken in a plane of rotation shown by the line 2—2 of Fig. 1.

In these views, the reference character 1 designates a vehicle brake drum, rigidly secured by rivets 2 to a wheel 3 fixed on a live axle 4 projecting from the usual housing 5. The usual backing plate 6 is bolted at 7 to said housing, exercising usual functions of mounting parts within the drum and closing the open side of the latter.

A pair of substantially semi-cylindrical, complementary brake shoes is installed within the drum, each comprising an outer member 8 of band form, equipped with the usual lining 9, and a web member 10 inwardly projecting from the band member and also terminally projecting some distance beyond said member. It is preferred to form each web member with a substantially arcuate slot 11, in close proximity to the corresponding band member and substantially coextensive with the lining 9, this affording the band members a slight flexibility relative to the web members and assuring more accurate conformity of the applied shoes to the drum.

The shoes are interconnected and normally retracted from the drum by coiled springs 12, and there is disclosed an improved fluid pressure means for separatively actuating the shoes and applying them under a regulable pressure. Thus disposed between corresponding ends of the shoes is an open-ended cylinder 13, bolted rigidly to the backing plate as indicated at 13a. Said cylinder is formed with a heavy partition 13b midway between its ends and a pair of pistons 14 slidingly fit the cylinder at opposite sides of said partition. Opening centrally in the outer faces of said pistons are sockets 14a receiving and conforming to hemispherical elements terminally formed on thrust-transmission heads 15 rigidly carried by said shoe ends. From the inner faces of the pistons, bosses 15a project axially of the cylinder and normally abut against the partition 13b. A fluid such as oil under suitable pressure is adapted to be delivered to the cylinder by a pipe 16 connected through the backing plate and a predeterminedly restricted passage 16a extends through the partition 13b affording a retarded flow of said fluid. For reasons which will presently appear it is desirable to connect the pipe 16 with the cylinder at that side of the partition which is advanced in the direction of normal drum rotation from the partition, this assuring that the piston at such side will respond slightly faster to a delivery of fluid to the cylinder than the other piston.

Between the other two ends of the web members 10 is interposed a wedge-forming nut 17, threaded on a bolt 18 parallel to the brake axis and mounted in a torque-transmitting lever 19 formed with a substantially central and approximately rectangular opening 20, freely accommodating said nut and affording it a travel on the bolt. The nut is preferably approximately rectangular in its cross section transverse to the bolt, and presents to the web members 10 opposed faces converging as they extend toward the backing plate. Thus by drawing the nut toward said plate, the shoes 8, 9, 10 may be increasingly separated in compensation for wear of their linings. The lever is integrally formed with an abutment 21 for the head 22 of said bolt, such abutment being bridged across the lever opening 20 and projecting through an oversized opening 23 in the backing plate, whereby the bolt head is readily accessible, with no interference by the backing plate. To guide the nut in travel on the bolt and restrain it from rotation relative to the lever, the latter is formed with a pair of guide ribs 24 projecting radially into the opening 20 and engaging in grooves 25 formed in the outer and inner faces of the nut. The lever 19 has a thickness materially exceeding that of the web members 10 and has slots 26 extending circumferentially of the brake from the opening 20 to accommodate the end portions of said members which engage the nut. The slots 26 afford free movement of said end portions to or from each other, while restraining them from movement along the bolt axis. Thus the shoes cannot respond to an adjustment of the nut toward the bolt head, except by a separative movement.

The lever 19 is adapted to swing through a small arc in a direction circumferential to the brake and for this purpose the inner end of the lever engages two fulcrum pins 27 parallel to the brake axis and spaced equally and oppositely from the radial axis of the lever. As illustrated, said pins are formed by the reduced inner ends of a pair of bolts 28, headed against the outer face of the backing plate and engaging a block 29 to clamp the same against the inner face of said plate. Said block engages between the backing plate and inner portion of the lever, properly spacing the latter from said plate. It is preferred to form the inner edge of the lever with approximately semicircular recesses partially receiving pins 27, whereby the lever may fulcrum on either pin, according to direction of brake drum rotation.

The convergent faces of the nut 17 are similarly formed with inner and an outer rounded ribs 30 and 31 spaced radially of the brake, and the edges of the web members 10 engaging said faces are substantially straight, as best appears in Fig. 7. The distances from the ribs 30 and 31 to the plane established by the pins 27 are related in a predetermined definite ratio which in the illustrated construction is one to three. The importance of this ratio will presently appear.

Considering now the operation of the described brake, it is first to be understood that the shoes 8, 9, 10 are normally retracted by the springs 12, their lower ends anchoring through the heads 15 against the partition 13b and their upper ends against the nut 17. The lever 19 which carries said nut is centered with respect to the vertical diameter of the brake, being subjected to equalized opposed forces by the springs 12 acting through the shoes.

When the pressure fluid is forced into the cylinder 13, the left-hand piston 14 promptly applies the corresponding shoe to the drum. The right-hand piston is not immediately affected owing to retarding effect of the restricted passage 16a.

Assuming a clock-wise rotation of the drum (as indicated by the arrow in Fig. 3), drum imposed torque anchors the right-hand shoe firmly against the partition 13b and the left-hand shoe undergoes a slight added circumferential advance permitted by swinging of the lever 19 as the latter applies the right-hand shoe. While movement of the right-hand piston also tends to apply the right-hand shoe, the time lag of this movement renders it negligible in effect. Movement of the nut 17 in unison with the lever effects a withdrawal from the left-hand shoe of the outer rib 31 normally abutted by said shoe and withdraws from the right-hand shoe the inner rib 30. Thus, as may be seen in Fig. 3, the torque-delivering shoe now takes effect only against an inner abutment rib of the nut and the torque-receiving shoe is acted upon only by an outer abutment rib. Since the lever is of the third class, and its power arm is one third the length of its work arm, it follows that torque transmitted to the right-hand shoe is one third of that delivered by the left-hand shoe. It is to be understood that the ratio, one to three, is merely illustrative, the main essential of the ratio employed being that it shall achieve a substantial equalization of the braking efforts imposed on the drum by the two shoes. It appears from tests of the described brake, however, that the ratio one to three is best adapted to effect the desired equalization, under ordinary conditions.

In applying the brake when drum rotation is reverse to normal, the left-hand shoe again is first to engage the drum but is rendered ineffective by torque until fluid pressure also applies the right-hand shoe. Torque then is transmitted through the lever from the right-hand to the left-hand shoe equalizing the efforts of the two shoes. By providing two fulcrum pins, as shown, arranged to function alternatively according to the direction of torque transmission, it is assured that the effective fulcrum will always lie in a direction substantially transverse to the direction of torque transmission, adapting the lever to properly effect such transmission. It is important to note that the pin 27 which is functioning as a fulcrum during a braking operation serves as an anchorage for the shoe transmitting torque through the lever, to the extent of two thirds of such torque.

It is a well-recognized objection to present types of two-shoe brakes, or at least most of them, that one of the shoes tends to receive considerably greater wear than the other, the shoes failing to exert equal efforts. Thus the maximum possible efficiency is not derived, and replacement of the linings is required more frequently than would be true if efforts of the shoes were equalized. My improved brake permits elimination of this objection, since the lever ratio is predetermined to effect transmission from the lever-actuating shoe of exact fraction of torque necessary to equalize the braking efforts of the two shoes.

A further advantage of the construction lies in its reduction to a minimum of the necessary brake pedal travel. This follows from the fact that the leverage ratio employed imposes three times the drum-engaging travel on the lever-actuated shoe as is applied to the lever-actuating shoe. Thus pedal travel is reduced by an amount equal to two thirds of the brake-applying travel of one of the shoes.

The convergent faces of the nut 17 permit of a fully adequate adjustment for wear, and in any position of such adjustment, the nut functions the same in maintaining the desired leverage ratio. It is to be noted that the nut is an essential part of the lever. It is an important feature of the nut that its inner ribs 30 converge at a slightly more acute angle than its outer ribs 31. This is necessary to avoid a withdrawal of the shoe ends from the outer ribs responsive to an adjustment for wear. Provision of a slight differential between the divergencies of the inner and outer ribs compensates for the slightly greater arcs of travel of the shoe points engaging the outer ribs than that of the points which engage the inner ribs, as the shoes swing about the heads 15 in undergoing adjustment for wear.

The invention is presented as including all such modifications and changes as come within the scope of appended claims.

What I claim is:

1. A brake comprising a brake drum, a pair of opposed brake shoes interiorly engageable with said drum, means associated with corresponding ends of said shoes for separatively actuating and applying them to the drum, a nut engaged between the other ends of said shoes, a torque-transmitting lever normally occupying a radial relation to the brake and mounting the nut and affording it sliding travel in a direction parallel to the brake axis, a screw rotatively carried by the lever and adapted to actuate the nut, fulcrum means engaged by an end of said lever, establishing a pivot axis parallel to the brake axis, said nut presenting divergent opposed faces to the shoes and said faces being similarly formed with shoe-engaging, torque-receiving areas and with shoe-engaging, torque-delivering areas located more remotely from said pivot axis than said receiving areas, and means holding the shoes normally yieldably retracted from the drum and in engagement with said areas of the nut, said shoes being free to alternatively undergo a limited advance with the drum, responsive to a torque imposed by the drum, and the lever being movable about its fulcrum from its normal radial position by such advance of either shoe, whereby the torque-delivering area of the nut is withdrawn from the advanced shoe and the torque-receiving area is withdrawn from the other shoe, and whereby said lever transmits a predetermined fraction of said torque from the advanced shoe to the other shoe.

2. In a brake as set forth in claim 1, means restraining the nut from rotation relative to the lever.

3. In a brake as set forth in claim 1, a backing plate apertured to give access to said screw.

4. A brake comprising a brake drum, a pair of opposed brake shoes interiorly engageable with said drum, a fluid pressure cylinder interposed between corresponding ends of said shoes and formed with a partition and a restricted fluid passage extending through said partition, a pair of pistons operative in said cylinder, one at each side of the partition, means for transmitting thrust from the respective pistons to the respective shoes for applying the shoes, and means for delivering a pressure fluid to the cylinder at one side only of said partition.

5. A brake as set forth in claim 4, said partition being engageable by at least one of said pistons when the brake is applied to provide an anchorage for the shoe engaged by said piston.

6. A brake comprising a brake drum, a pair of opposed brake shoes interiorly engageable with said drum, means associated with corresponding ends of said shoes for separatively actuating and applying them to the drum, a torque-transmitting lever normally occupying a radial relation to the brake and engaged between the other ends of said shoes, fulcrum means engaged by an end of said lever, establishing two pivot axes parallel to the brake axis, spaced circumferentially of the brake, and functioning alternatively, according to the direction of torque transmission through the lever, said lever presenting opposed faces to the shoes and said faces being similarly formed with shoe-engaging, torque-receiving areas and with shoe-engaging, torque-delivering areas, said receiving and delivering areas being spaced radially of the brake, and means holding the shoes normally yieldably retracted from the drum and in engagement with said areas of the lever, said shoes being free to alternatively undergo a limited advance with the drum, responsive to a torque imposed by the drum, and the lever being movable about its fulcrum from its normal radial position by such advance of either shoe, whereby the torque-delivering area is withdrawn from the advanced shoe and the torque-receiving area is withdrawn from the other shoe, and whereby said lever transmits a predetermined fraction of said torque from the advanced shoe to the other shoe.

7. A brake comprising a brake drum, a pair of opposed brake shoes interiorly engageable with said drum, means associated with corresponding ends of said shoes for separatively actuating and applying them to the drum, a torque-transmitting lever normally occupying a radial relation to the brake and engaged between the other ends of said shoes, said lever having two guide portions for the respective shoes adapted to restrain the shoes from movement relative to the lever in a direction parallel to the brake axis and said lever having an element between said guide portions for receiving and delivering torque, fulcrum means engaged by an end of said lever, establishing a pivot axis parallel to the brake axis, said lever presenting opposed faces to the shoes and said faces being similarly formed with shoe-engaging, torque-receiving areas and with shoe-engaging, torque-delivering areas, said receiving and delivering areas being spaced radially of the brake, and means holding the shoes normally yieldably retracted from the drum and in engagement with said areas of the lever, said shoes being free to alternatively undergo a limited advance with the drum, responsive to a torque imposed by the drum, and the lever being movable about its fulcrum from its normal radial position by such advance of either shoe, whereby the torque-delivering area is withdrawn from the advanced shoe and the torque-receiving area is withdrawn from the other shoe, and whereby said lever transmits a predetermined fraction of said torque from the advanced shoe to the other shoe.

8. A brake comprising a brake drum, a pair of opposed brake shoes interiorly engageable with said drum, means associated with corresponding ends of said shoes for separatively actuating and applying them to the drum, a nut engaged between the other ends of said shoes presenting to said ends divergent faces both similarly formed with torque receiving areas and torque delivering areas, spaced radially of the brake, a torque-transmitting lever normally occupying a substantially radial relation to the brake and chambered to receive said nut and having provision for guiding the nut in a travel substantially parallel to the brake axis, fulcrum means engaged by said lever establishing an axis substantially parallel to the brake axis, a screw rotatively engaging said nut for adjusting it in said travel, and abutting against the lever to resist the reaction of the nut, and means holding the shoes normally yieldably retracted from the drum and engaged with the nut, said shoes being free to alternatively undergo a limited advance with the drum, responsive to a torque imposed by the drum, and the lever being movable about its fulcrum from its normal radial position by such advance of either shoe, whereby the torque-delivering area of the nut is withdrawn from the advanced shoe and the torque-receiving area is withdrawn from the other shoe, and whereby said lever transmits a predetermined fraction of said torque from the advanced shoe to the other shoe.

9. A brake as set forth in claim 8, the nut-engaging end portions of said shoes having an engagement with the lever maintaining substantial alignment of said end portions.

10. A brake comprising a brake drum, a pair of opposed brake shoes interiorly engageable with said drum, means associated with corresponding ends of said shoes for separatively actuating and applying them to said drum, a wear-compensating element interposed between the other ends of said shoes presenting to said ends divergent faces both similarly formed with torque-receiving areas and torque-delivering areas, spaced radially of the brake, a torque-transmitting lever normally occupying a substantially radial relation to the brake and chambered to receive said element and having provision for guiding said element in a travel substantially parallel to the brake axis, fulcrum means engaged by said lever establishing an axis substantially parallel to the brake axis, means carried by said lever for adjusting said element in selective positions of such travel and for maintaining its adjustment, and means holding the shoes normally yieldably retracted from the drum and engaged with said element, the shoes being free to alternatively undergo a limited advance with the drum responsive to a torque imposed by the drum, and the lever being movable about its fulcrum from its normal radial position by such advance, whereby the torque-delivering area of said element is withdrawn from the advanced shoe and the torque-receiving area is withdrawn from the other shoe and whereby said lever transmits a predetermined portion of said torque from the advanced shoe to the other shoe.

11. A brake as set forth in claim 10, the lever having a provision for holding the shoes properly engaged with said element.

12. In an adjustment for brake wear, the combination with a pair of opposed brake shoes, of means effective on corresponding ends of said shoes for swinging actuation of the shoes from each other, an element interposed between the other ends of the shoes presenting divergent faces to the shoes, means for yieldably retracting the shoes into engagement with said divergent faces, and means for adjusting the interposed element transversely to the shoes to vary the spaced relation of the shoe ends engaging said element, said faces varying in their divergency at the inner and outer portions of said element to compensate for the greater arcs of wear-compensating travel of the shoes where acted upon by the outer portions of said element.

CHARLES A. SAWTELLE.